United States Patent [19]
Willich

[11] 3,870,286
[45] Mar. 11, 1975

[54] FLUID SPRINGS, PARTICULARLY FOR VEHICLES

[75] Inventor: Jean Herbert Willich, Ennepetal, Germany

[73] Assignee: Firma August Bilstein, Ennepetal, Germany

[22] Filed: Oct. 17, 1973

[21] Appl. No.: 407,238

[30] Foreign Application Priority Data
Nov. 11, 1972 Germany .......................... 2255304

[52] U.S. Cl. .................. 267/64 R, 267/35, 267/8 R
[51] Int. Cl. ............................................. B60q 11/26
[58] Field of Search ............................ 267/35, 8, 64

[56] References Cited
UNITED STATES PATENTS
3,191,964   6/1965   Chambers ............................ 267/35
3,497,198   2/1970   Miller ................................... 267/35

Primary Examiner—James B. Marbert
Attorney, Agent, or Firm—Neuman, Williams, Anderson & Olson

[57] ABSTRACT

In a fluid spring, preferably a gas spring, for motor vehicles an elastic, internally reinforced rolling sleeve is clamped at each end between two components connected to two masses which are to be resiliently held apart. The sleeve is formed as a portion of a continuously produced cylindrical tube of constant wall thickness. At least one end of the sleeve is preferably incurved or recurved where it is clamped to the associated component and the axial end faces outwardly of the gas spring and not towards the internal chamber. The sleeve may also be clamped at at least one position between its two ends to provide additional support.

9 Claims, 9 Drawing Figures

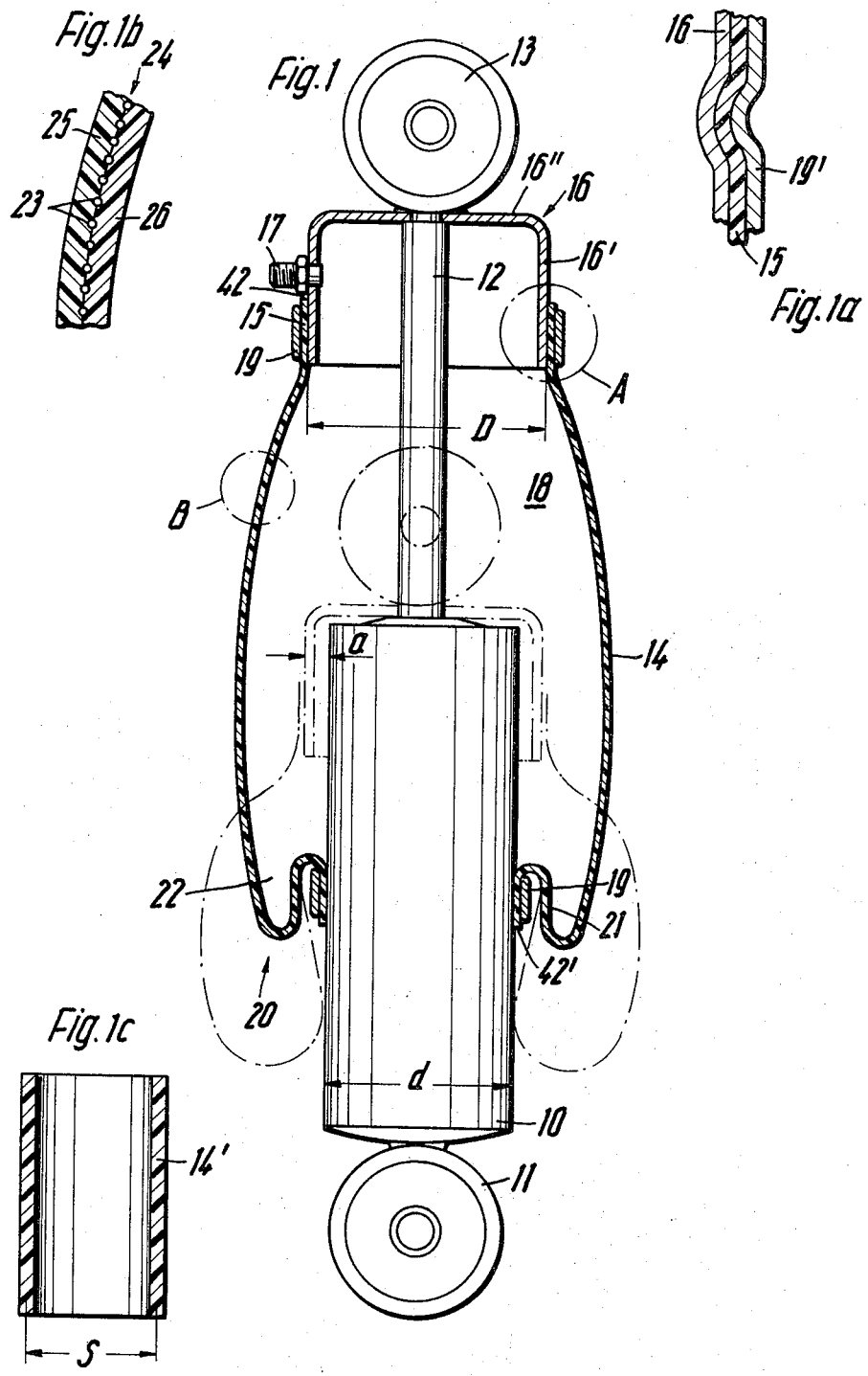

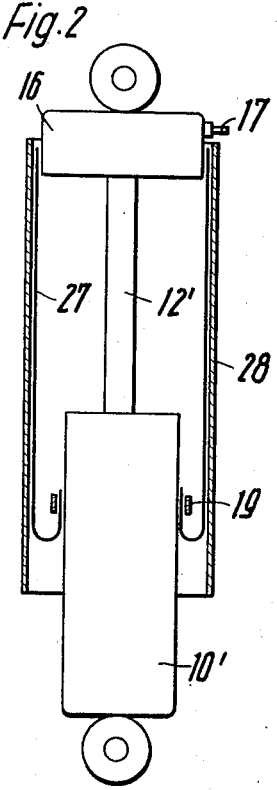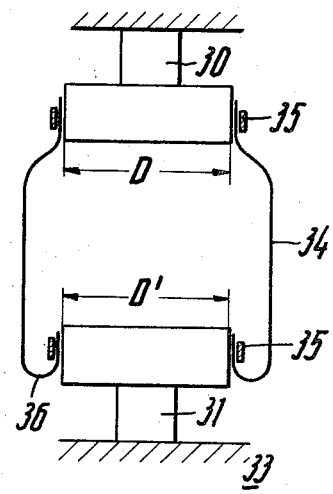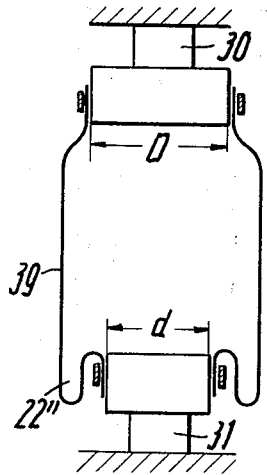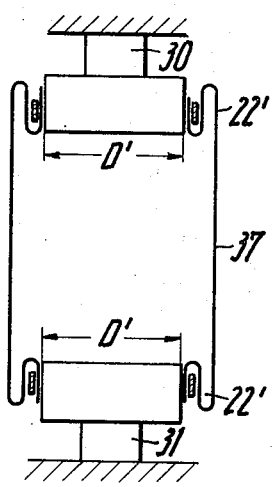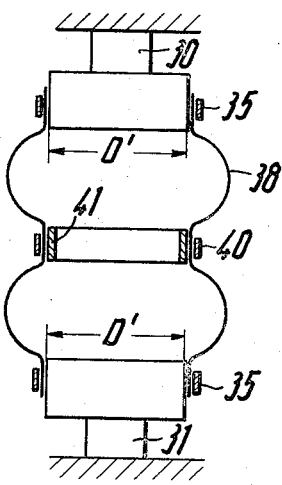

FLUID SPRINGS, PARTICULARLY FOR VEHICLES

FIELD OF THE INVENTION

This invention relates to fluid springs, particularly for vehicles, comprising two components arranged to be connected to two masses which are to be resiliently held apart, and an elastic, internally reinforced, rolling sleeve secured at each end in gas-tight sealing relationship to the respective components. Although the invention is applicable quite generally to springs filled with gas, such as air, or liquid, a gas is more generally used and will be referred to hereinafter.

DESCRIPTION OF THE PRIOR ART

Certain known gas springs have rolling or folding sleeves of rubber which are reinforced by a reinforcing insert to strengthen them against excessive lateral deformation. At their ends these sleeves are provided with beads by means of which the sleeves are secured by specially shaped portions of the rigid gas spring components which are matched in shape to the beads. In many cases the beads have to be strengthened by wire inserts.

Certain of the known sleeves are frusto-conical in shape or are formed in such a way that when the spring is not pressurised friction does not arise between the sleeve surfaces when the components of the gas spring carrying the sleeve are moved relative to one another. This is possible for example if the gas spring is used as an auxiliary gas spring in conjunction with spring suspension units on a vehicle.

The manufacture of these known sleeves is expensive since the sleeve reinforcing inserts have to be fitted in special working steps in the manufacturing process. For example, a sleeve inner layer must first be produced on a core, and then a fabric reinforcing insert is laid over the inner layer by hand, whereafter the sleeve outer layer can be laid over it after assembly of the outer mould. Such manufacturing steps made the production of the sleeves expensive and because of the increased number of operational steps there is a greater possibility for faults to occur in the sleeves produced in this way.

SUMMARY OF THE INVENTION

It is an object of the present invention to provide a fluid spring of the type first mentioned above whose manufacturing costs are kept low, which has a long life, and in which the rolling sleeve can be secured to the components of the spring in a simple manner.

In accordance with the present invention this is achieved by a fluid spring, particularly for vehicles, comprising two components arranged to be connected to two masses which are to be resiliently held apart, and an elastic, internally reinforced, rolling sleeve clamped at each end in gas-tight sealing relationship to the respective components, wherein the reinforced rolling sleeve is a portion of a continuously manufactured cylindrical tube of constant wall thickness cut to a desired length, and wherein the ends of the rolling sleeve are secured by annular clamping means.

With the present invention it is important that the rolling sleeve is no longer formed as a conical or folded elastic element, but rather that in its unmounted state it is a cylindrical tube. Thus, in an advantageous way, it can be a part of a continuously manufactured cylindrical tube of constant wall thickness. The tubular sleeve lengths can be produced considerably more economically than the previous conventional individually made sleeves. The rolling sleeves of the present invention are also more uniform and reliable, and this means as a consequence that there is a lower rejection rate for the finished springs. It is also significant that the ends of the rolling sleeve are secured by annular clamping means, such as clamping rings. These avoid the need for the special mould parts previously used to secure the beads of the conventional sleeves. The clamping of the rolling sleeve ends by clamping rings can be carried out in a technically simple way and is particularly suitable for mass production. The clamping itself is durable and the disposition of the clamping zones on the components which are to be connected to the masses to be supported can be altered or corrected as required.

In one preferred arrangement, one end of the rolling sleeve is incurred and is secured by a clamping ring which engages against the internal surface of the sleeve. This incurving of the sleeve means that the sleeve undergoes a rolling motion at the incurved zone as the two components which carry the ends of the sleeve move towards one another. The sleeve only rolls at this zone and is not affected by bulging at the clamping zone which is remote from the incurved end. This incurving at one end of the sleeve is also recommended to take account of different clamping diameters of the components carrying the ends of the sleeve.

The radially outwardly facing surface of the rolling sleeve may be enclosed by a casing which additionally forms the clamping means for one end of the sleeve. The casing protects the external surface of the rolling sleeve to a large extent against mechanical damage, and on the other hand can also be made so thin that any deformation necessary for fixedly clamping said one end of the sleeve is possible.

At least one end of the rolling sleeve may be recurved inwardly and have the internal surface of its recurved end portion in contact with one of the components and secured to said component by a clamping ring which engages against the external surface of said recurved end portion. The recurved end portion forms an annular bag to a depth equal to that of the clamping ring, with the result that the rolling zone of the sleeve on operation of the gas spring is predetermined. The same surface of the rolling sleeve rests against the associated component parts at both clamping zones so that both clamping zones show the same sealing properties independently of the construction of the internal and external surface of the sleeve.

The clamping diameters of the components which receives the ends of the rolling sleeve may be of different size with the diameter of the rolling sleeve dimensioned to be equal to the smaller clamping diameter. This means that the rolling sleeve only rolls at one region, namely in the vicinity of the smaller diameter component.

In one particular embodiment of the invention, the rolling sleeve, in addition to being secured at its ends, may also be secured at at least one region between its ends to a support ring by means of a further clamping ring. The gas spring can then be used with greater internal pressures since the sleeve is stiffened by this additional support. In addition, the radial bulging of the sleeve in comparison to a sleeve which is not supported between its ends is reduced. All the clamping rings engage the external surface of the rolling sleeve which is thereby sub-divided in the manner of a folded sleeve, so that for a particular length of gas spring there is the minimum expenditure necessary for the material of the rolling sleeve.

Preferably, the said end faces of the ends of the rolling sleeve are not subjected to the internal pressure of the spring chamber but face outwardly of the gas spring. In this way one prevents the gas pressure in the spring chamber acting on the sleeve end faces since gas can escape through the fabric insert between the layers of the rolling sleeve.

BRIEF DESCRIPTION OF THE DRAWINGS

A number of embodiments of the invention will now be described by way of example and with reference to the accompanying drawings. In the drawings:

FIG. 1 is a schematic longitudinal view, partly in section, through a spring suspension unit for a motor vehicle consisting of a shock absorber and an auxiliary gas spring;

FIGS. 1a and 1b show on an enlarged scale two particular parts of the unit of FIG. 1 lying within the circles A and B respectively.

FIG. 1c shows an unmounted rolling sleeve;

FIG. 2 is a schematic representation of a suspension unit with a special form of auxiliary gas spring; and, FIGS. 3 to 6 are schematic representations of gas springs with respective different arrangements and means of securement of the rolling sleeve.

DESCRIPTION OF THE PREFERRED EMBODIMENTS

The shock absorber shown in FIG. 1 comprises a working cylinder 10 at the lower end of which is fitted an attachment lug 11 by means of which the suspension unit may be secured for example to the wheel axle of a motor vehicle. A piston rod 12 of the shock absorber projects from the other end of the working cylinder 10 and is provided with an attachment lug 13 at its upper end by means of which the suspension unit may be secured for example to the chassis of a motor vehicle. The fluid spring which operates in conjunction with the shock absorber (and which will hereinafter be referred to as a gas spring) comprises a rolling sleeve 14 which has its lower end 21 clamped in gas-tight sealing relationship to the external surface of the working cylinder 10 and which has its other, upper end 15 in engagement with a cap 15 which is carried by the piston rod 12. The cap 16 comprises a cylindrical portion 16' which is positioned co-axially with respect to the piston rod and the working cylinder, and a cover 16'' which constitutes an outward closure plate for the cylindrical portion 16' and which is secured between the end of the piston rod and the attachment lug 13. A gas filling inlet 17 is provided in the cylindrical portion 16' of the cap so that the spring chamber 18 defined by the cap 16, the rolling sleeve 14 and the working cylinder 10 can be filled with gas. It should be appreciated that this spring chamber 18 may be filled with air, with some other gas, or even with a liquid, hence the reference herein to a fluid spring. In FIG. 1 and FIGS. 2 to 6 the spring chamber 18 is filled with the desired medium to the required pressure which is determined by the spring characteristics of the unit and the distance between the two parts, e.g., axle and chassis, which are being resiliently held apart by the unit.

In contrast, FIG. 1c shows the unmounted, fabric-reinforced rolling sleeve cut to the desired length from a continuously manufactured cylindrical tube of constant wall thickness. The diameter S of the severed portion 14', i.e., the rolling sleeve, is dimensioned to be equal to the diameter $d$ of the working cylinder 10 which is smaller than the external diameter D of the cap 16. It is fitted on to the working cylinder 10 by stretching it slightly and is then secured by a clamping ring 19. The fastening of the sleeve to the cap 16 is effected by stretching the rolling sleeve to the external diameter D of the cap. A clamping ring 19 or 19' (FIG. 1a) is used to secure the sleeve to the cap 16. The external diameter D of the cap 16 is kept as small as possible in order to avoid weakening the sleeve material by the stretching of it.

The position of the suspension unit shown by chain-dotted lines in FIG. 1 upon full compression and maximum movement of the piston ring 12 into the working cylinder makes it possible to appreciate the difference $a$ between the two clamping diameters $d$ and D. Moreover, it is clear that the sleeve only rolls in the region of the clamping ring at the lower clamping zone, namely in the region 20, while at the upper clamping zone there is no rolling of the sleeve end 15. This is achieved in part by the fact that the diameter S of the rolling sleeve is dimensioned to be equal to the smaller clamping diameter $d$, so that the work which needs to be performed on the sleeve to curve or deform it is less at the region 20 than in the vicinity of the upper clamping ring 19 where the sleeve has already been stressed by the stretch-fitting of the sleeve, on to the cap. Furthermore, the special fastening of the lower end 21 of the rolling sleeve contributes to the fact that only at this region does a rolling movement of the sleeve take place. For this purpose, the axial distance between the clamping rings is maintained shorter than the lengh of the rolling sleeve, so that an annular pocket 22 is formed. This pocket 22 is formed by the end 21 of the rolling sleeve which is first incurved and then recurved or folded back on itself, with the internal surface of the recurved portion of the end of the sleeve being in engagement with the working cylinder 10. Upon movement of the piston rod 12 into the working cylinder 10 the pocket 22 expands in the manner shown in FIG. 1, so preventing any rolling of the sleeve at the upper clamping region A.

The part-section shown on an enlarged scale in FIG. 1b and which is a view of the encircled portion B of FIG. 1 shows the fabric-reinforcing insert 24 which is enclosed between elastic sleeve layers 25 and 26 and which is made up of individual threads 23. The fabric insert 24 must make it possible for the elastic rolling sleeve to move without suffering fatigue damage and for this purpose in particular it must take up and absorb the radially outwardly acting forces. It is possible to use a plurality of fabric layers and/or concentrically extending fabric threads, the latter absorbing these forces particularly well. The outer sleeve layer 25 must be dirt-resistant, and thus in particular must be resistant to salt, ozone and the like. The inner sleeve layer 26 must in particular be resistant to water of condensation and to the gas within the chamber 18. In the embodiment shown in FIG. 1 the inner sleeve layer must also be resistant to oil, in order that it will not be attacked by any damping liquid which may escape from the working cylinder. The fabric insert msut be so constructed and incorporated in the sleeve that no air penetrates between the axial end faces 42, 42' of the sleeve. Preferably, the axial end faces 42, 42' of the rolling sleeve end are not subjected to the greater than atmospheric pressure within the spring chamber 18 because they face towards the ambient atmosphere surrounding the gas spring. This is the case with the axial end surfaces 42 and 42' in FIG. 1.

FIG. 1a shows the upper clamping region A on an enlarged scale. The clamping ring 19' and the cap 16 are each provided with an annular groove-type deformation by means of which the upper end 15 of the rolling sleeve is held positively by virtue of the shape as well as by virtue of the clamping force exerted by the ring.

The forces needed to achieve this deformation may be obtained mechanically or by magnetic shock. It should be appreciated that the particular shape of the deformation may take some other form, as desired. Nevertheless in cases where the load on the gas spring is not sufficient to lead to the separation of a purely force-fitted connection between the clamping ring and the cap, the deformation can be dispensed with. The clamping ring then has the cross-section shown in FIG. 1.

The auxiliary gas spring shown in FIG. 2 in conjunction with a shock absorber 10', 12' essentially comprises a rolling sleeve 27 whose lower end is incurved and is secured to the working cylinder 10'. The lower clamping ring 19 engages against the internal surface of the rolling sleeve and presses the external surface of the sleeve against the working cylinder. The upper end of the rolling sleeve 27 is clamped securely between the cap 16 and a casing 28 so that the latter takes over the role of the upper clamping ring. The casing 28 extends axially from the upper clamping region to below the lower clamping region so that the external surface of the rolling sleeve is protected against direct impacts from flying stones and the like. The casing 28 also fulfils a supporting function in respect of radially acting pressure forces of the spring chamber and this means that the rolling sleeve can only roll in the annular chamber formed between the casing 28 and the working cylinder 10'. The external diameter of the cap 16 which bears the filling inlet 17 must be made correspondingly larger than the diameter D of the cap 16 in FIG. 1.

The gas ring shown schematically in FIG. 3 comprises two relatively movable components 30 and 31 which may be of any desired construction, the only conditions being that on the one hand the components 30, 31 are adapted to be secured to the masses 32 and 33 which are to be resiliently held apart and that on the other hand they have clamping diameters D and D' such as the ends of the elastic rolling sleeve 34 can be secured to them. The fastening of the ends of the sleeve is effected by clamping rings, namely bands, collars, or other equivalent means, for which the statements made above with reference to FIGS. 1 and 1a also hold true. The lower end of the rolling sleeve is incurved so that the rolling sleeve will only roll downwardly at 36 upon a decrease in the distance between the two components 30 and 31 and will remain substantially undeformed at the upper end.

In the gas springs shown in FIG. 5 and 6 the two clamping diameters D' are of the same size. In contrast to FIG. 3, the arrangement shown in FIG. 5 has regions of recurvature 22' similar to FIG. 1 at both ends of the sleeve so that the rolling sleeve 37 rolls both at its upper end and at its lower end and is thus symmetrically deformed. The rolling sleeve 39 in FIG. 4 however rolls in exactly the way described above with reference to FIG. 1 since in the gas spring of FIG. 4 there is a zone of recurvature 22" only at the lower end and the two components between which the sleeve is connected have different diameters D, d.

The gas spring shown in FIG. 6 has the special feature that both ends of the rolling sleeve are secured by clamping rings 35 around the associated components 30 and 31 without the need for incurving or recurving of the sleeve ends in the manner shown in FIG. 3 or FIG. 4. In its central region the rolling sleeve 38 is encircled by a further clamping ring 40 and is clamped by it to a support ring 41. The arrangement is preferably made symmetrical so that both halves of the rolling sleeve will be elastically deformed in the same way and to the same extent by the pressure in the spring chamber.

I claim:

1. A fluid spring, particularly for vehicles, comprising two components arranged to be connected to two masses which are to be resiliently held apart, and an elastic, internally reinforced, rolling sleeve clamped at each end in gas-tight sealing relationship to the respective components, wherein the reinforced rolling sleeve is a portion of a continuously manufactured cylindrical tube of constant wall thickness cut to a desired length, and wherein the ends of the rolling sleeve are secured by annular clamping means.

2. A fluid spring as claimed in claim 1, in which one end of the rolling sleeve is incurved and is secured by a clamping ring which engages against the internal surface of the sleeve.

3. A fluid spring as claimed in claim 2, in which the radially outwardly facing surface of the rolling sleeve is enclosed by a casing which additionally forms the clamping means for one end of the sleeve.

4. A fluid spring as claimed in claim 1, in which at least one end of the rolling sleeve is recurved inwardly and has the internal surface of its recurved end portion in contact with one of said components and is secured to said component by a clamping ring in engagement with the external surface of said recurved end portion.

5. A fluid spring as claimed in claim 1, in which the clamping diameters of the components which have the ends of the rolling sleeve secured thereto are of different size, and the diameter of the rolling sleeve is equal to the smaller of said clamping diameters.

6. A fluid spring as claimed in claim 1, in which the rolling sleeve in addition to being secured at its ends is also secured at at least one region between its ends to a support ring by means of further annular clamping means.

7. A fluid spring as claimed in claim 6, in which each of the annular clamping means is in engagement with the external surface of the rolling sleeve which is subdivided thereby.

8. A fluid spring as claimed in claim 1, in which one end of the reinforced rolling sleeve is secured to the working cylinder of a shock absorber and the other end of the sleeve is secured to a cap which is carried by the piston rod of the shock absorber.

9. A fluid spring as claimed in claim 1, in which the axial end faces of the ends of the rolling sleeve are not subjected to the internal pressure of the spring and face outwardly of the gas spring.

* * * * *